(12) United States Patent
Zebian

(10) Patent No.: US 11,220,958 B2
(45) Date of Patent: Jan. 11, 2022

(54) TURBOMACHINE HAVING AN AIR INTAKE DE-ICING SYSTEM

(71) Applicant: Airbus Operations SAS, Toulouse (FR)

(72) Inventor: Maxime Zebian, Saint-Sauveur (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 268 days.

(21) Appl. No.: 16/674,095

(22) Filed: Nov. 5, 2019

(65) Prior Publication Data
US 2020/0165972 A1    May 28, 2020

(30) Foreign Application Priority Data

Nov. 22, 2018   (FR) .................................. FR1871713

(51) Int. Cl.
| | | |
|---|---|---|
| *F02C 7/047* | (2006.01) | |
| *F01D 25/02* | (2006.01) | |
| *F02C 6/08* | (2006.01) | |
| *B64D 33/02* | (2006.01) | |
| *B64D 15/04* | (2006.01) | |

(52) U.S. Cl.
CPC .............. *F02C 7/047* (2013.01); *F01D 25/02* (2013.01); *B64D 15/04* (2013.01); *B64D 2033/0233* (2013.01); *F02C 6/08* (2013.01)

(58) Field of Classification Search
CPC .... F02C 7/047; F02C 6/08; F02C 7/14; F02C 7/16; F01D 25/02; B64D 2033/0233; B64D 15/04; Y02T 50/60; F05D 2220/323; F05D 2260/213; F02K 3/115
See application file for complete search history.

(56) References Cited

U.S. PATENT DOCUMENTS

| 3,981,466 A | 9/1976 | Shah | |
| 5,423,174 A * | 6/1995 | Mouton | ................... F02C 7/224 |
| | | | 60/39.093 |

(Continued)

FOREIGN PATENT DOCUMENTS

| FR | 3054856 A1 | 2/2018 |
| WO | 2014155009 A1 | 10/2014 |

OTHER PUBLICATIONS

French Search Report; priority document.

*Primary Examiner* — Gerald L Sung
*Assistant Examiner* — Rene D Ford
(74) *Attorney, Agent, or Firm* — Greer, Burns & Crain, Ltd.

(57) ABSTRACT

A turbomachine comprising an engine body and an annular nacelle. The nacelle has an air intake comprising an outer skin, an inner skin, an air intake lip connecting the outer and inner skins together, and an annular frame connecting the outer and inner skins together. The turbomachine comprises a system for de-icing the air intake having an air bleeding port for bleeding a flow of hot air from the engine body, and two interconnected heating systems. An inner skin heating system receives the hot air flow to heat, by means of a gas-liquid heat exchanger, a heat transfer liquid contained in a hydraulic circuit arranged in part in the heat exchanger and in the inner skin. An air intake lip heating system diffuses the flow of hot air, once it has passed through the inner skin heating system, through the annular frame to heat the air intake lip.

7 Claims, 3 Drawing Sheets

(56) References Cited

U.S. PATENT DOCUMENTS

| | | | | |
|---|---|---|---|---|
| 7,984,606 B2* | 7/2011 | Smith | ............... | F02C 7/14 |
| | | | | 60/266 |
| 7,997,062 B2* | 8/2011 | Sun | ............... | F02C 7/14 |
| | | | | 60/266 |
| 10,233,841 B2* | 3/2019 | Bintz | ............... | F02C 7/14 |
| 2013/0098471 A1* | 4/2013 | Porte | ............... | F02C 7/04 |
| | | | | 137/15.1 |
| 2015/0275769 A1* | 10/2015 | Foutch | ............... | F02C 7/27 |
| | | | | 60/776 |
| 2015/0291284 A1 | 10/2015 | Victor et al. | | |
| 2016/0017751 A1 | 1/2016 | Caruel | | |
| 2016/0160758 A1* | 6/2016 | Marchaj | ............... | F02K 3/06 |
| | | | | 60/779 |
| 2017/0268430 A1* | 9/2017 | Schwarz | ............... | B64D 13/06 |
| 2018/0038280 A1 | 2/2018 | Rogero et al. | | |
| 2018/0209338 A1* | 7/2018 | Alecu | ............... | F02C 7/185 |
| 2019/0118955 A1* | 4/2019 | Porte | ............... | B64D 33/02 |

* cited by examiner

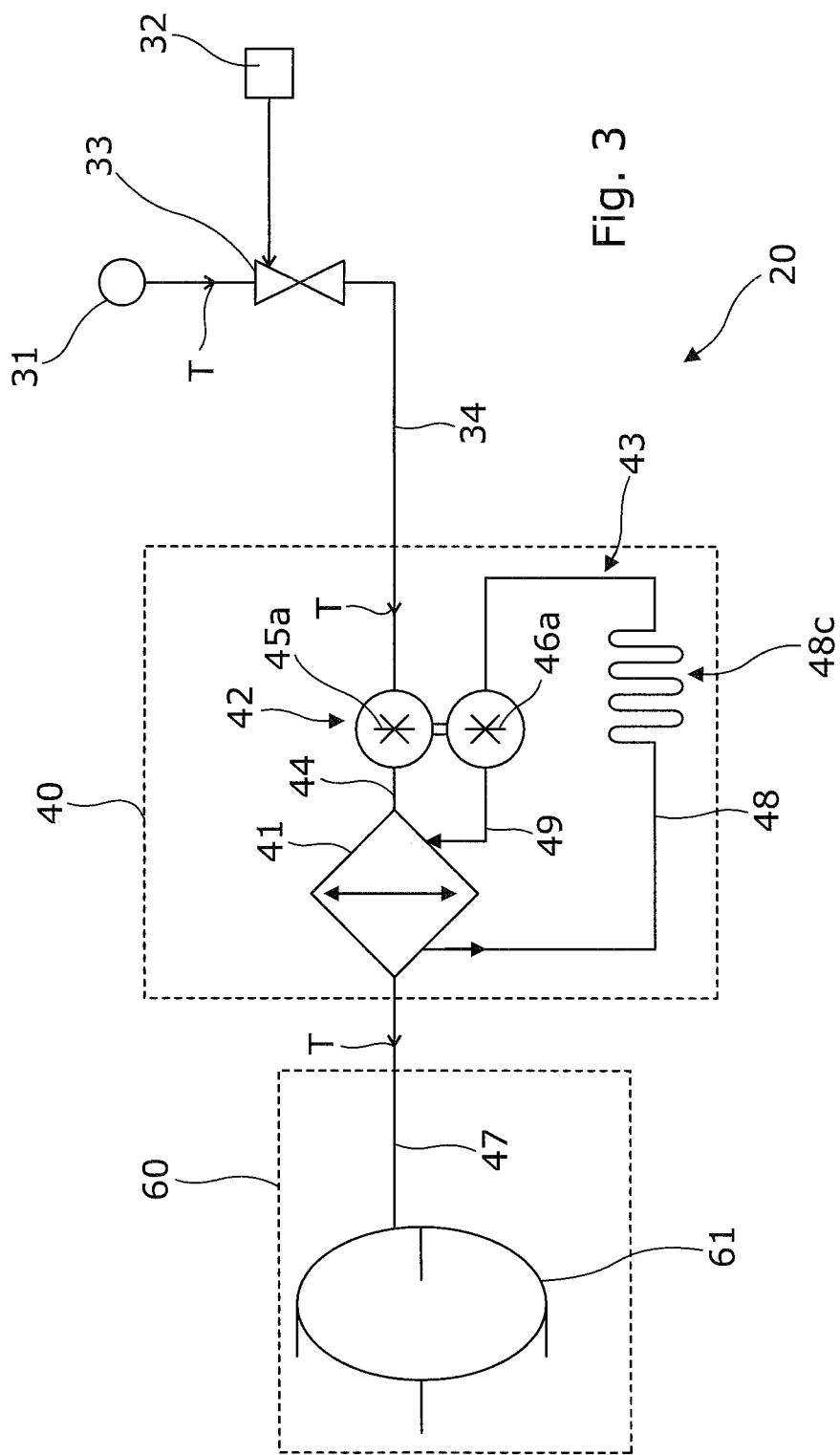

TURBOMACHINE HAVING AN AIR INTAKE DE-ICING SYSTEM

CROSS-REFERENCES TO RELATED APPLICATIONS

This application claims the benefit of the French patent application No. 1871713 filed on Nov. 22, 2018, the entire disclosures of which are incorporated herein by way of reference.

FIELD OF THE INVENTION

The present invention relates to a turbomachine equipped with a de-icing system for de-icing the air intake.

BACKGROUND OF THE INVENTION

As is known, a turbomachine comprises a nacelle having an air intake for channeling the air drawn into the nacelle towards the fan. The air intake comprises portions in contact with the outside air and consequently potentially subject to icing. It is known, in order to eliminate any accretion of ice, to heat these portions using a de-icing system which is either of the electric type (operating by resistance or induction) or of the pneumatic type (operating by bleeding hot air from the engine).

With the aim of reducing the mass of the air intake, the portions in contact with the air are made of composite materials or lightweight metals such as aluminum. It is known that both composite materials and aluminum have low heat tolerance (of the order of 150° C. for composite materials, 300° C. for aluminum) and, owing to this, only electric de-icing systems are used for air intakes made of composite materials or aluminum. Indeed, pneumatic de-icing systems can, during specific operating modes of the engine, generate high temperatures (above 150° C.) which can damage the portions made of composite materials or aluminum.

Electric de-icing systems operate using a high-power electrical signal provided by electrical cables passing via the wing between the high-power core of the aircraft, located in the fuselage of the aircraft, and the air intake. By contrast, using the hot air bled directly from the engine, pneumatic de-icing systems have the advantage of being less complex to install and of representing less of a penalty in terms of mass.

There is a need to find a pneumatic de-icing system that is compatible with an air intake made in part of composite materials and/or aluminum.

Patent document US 2015/291284 describes a pneumatic de-icing system in which the flow of hot air bled from the engine is cooled, using the air outside the nacelle, before being sent to the air intake for de-icing purposes.

SUMMARY OF THE INVENTION

The invention aims to find an alternative solution for reducing the temperature of the hot air bled from the engine, and relates to a two-flow turbomachine. The two-flow turbomachine comprises an engine body and an annular nacelle surrounding the engine body. The nacelle has an air intake comprising an outer skin, an inner skin, an air intake lip forming a leading edge of the nacelle and connecting the outer and inner skins to one another, and an annular frame connecting the outer and inner skins to one another. The inner skin comprises a first panel in contact with the air entering the nacelle, a second panel at a distance from the first panel, and a core interposed between the two panels. The turbomachine comprises a system for de-icing the air intake having an air bleeding port for bleeding a flow of hot air from the body of the engine. The de-icing system comprises an inner skin heating system, which system is connected to the air bleeding port to receive the flow of hot air, a gas-liquid heat exchanger through which the flow of hot air passes, a hydraulic circuit containing a heat transfer liquid and arranged in part in the heat exchanger and in the core, and a device for passive pumping of the heat transfer liquid configured to operate with a circulation of the flow of hot air. The de-icing system further comprises a heating system having a circulation line connected to the inner skin heating system to receive the flow of hot air after it has passed through said system, the circulation line comprising at least one extension passing through the annular frame and extending into the space bounded by the air intake lip, the inner skin, the outer skin and the annular frame.

BRIEF DESCRIPTION OF THE DRAWINGS

The above-mentioned features of the invention, along with others, will become more clearly apparent on reading the following description of one exemplary embodiment, said description being given with reference to the appended figures, in which:

FIG. 3 is a schematic view of the air intake de-icing system shown in FIG. 1, according to another embodiment of the invention.

DETAILED DESCRIPTION OF THE PREFERRED EMBODIMENTS

Figure 1:
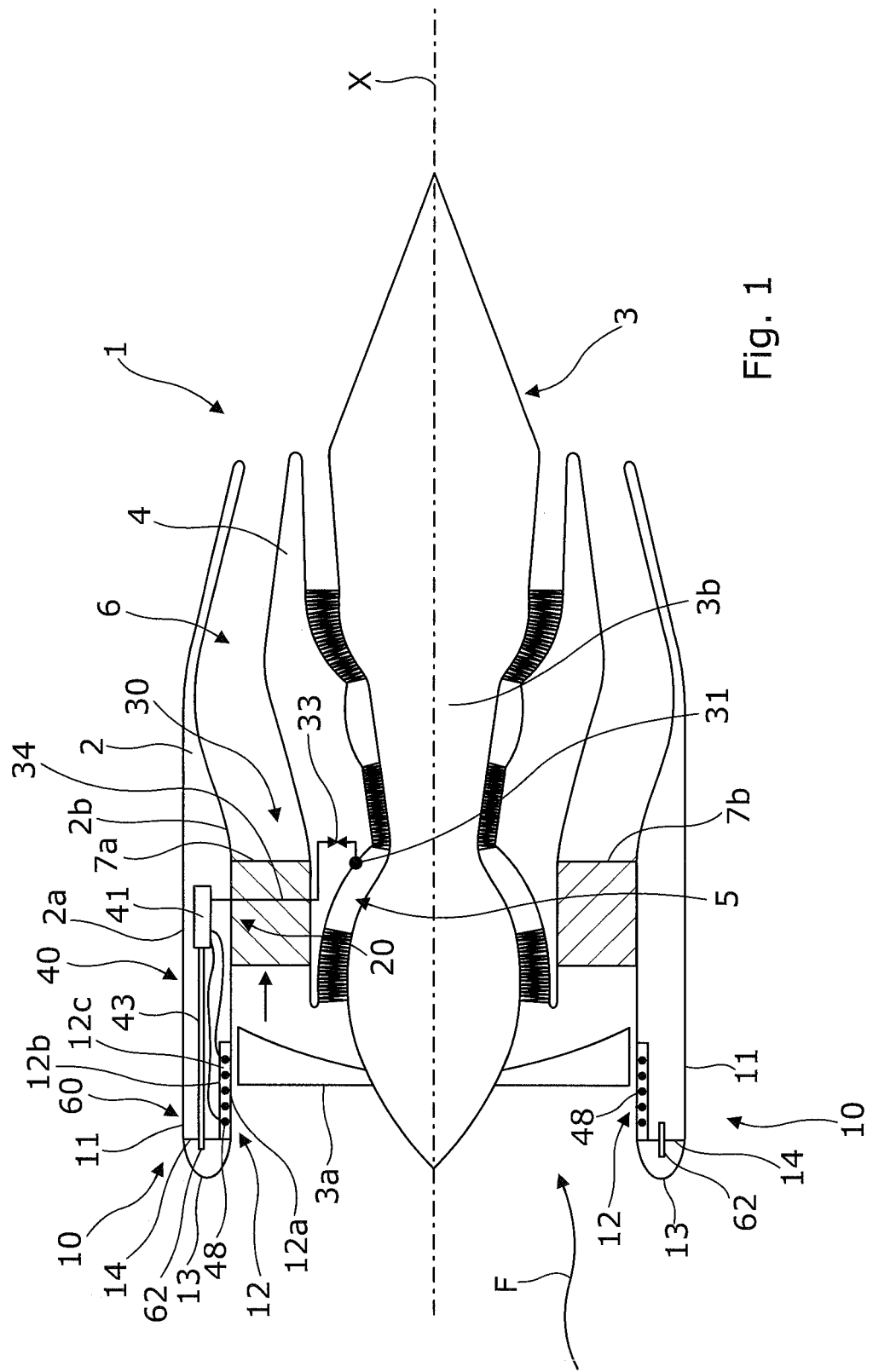
FIG. 1 is a schematic view, in section along a longitudinal axis, of a turbomachine equipped with a system for de-icing the air intake of the nacelle.

With reference to FIG. 1, a two-flow turbomachine 1 comprises an annular nacelle 2 that is centered on a longitudinal axis X (referred to as the engine axis) and surrounding an engine 3.

In the direction of flow of a flow of air (arrow F) passing through the turbomachine 1 during operation of the latter, the engine 3 comprises, from upstream to downstream in the direction of flow of the flow of air F, and centered on the engine axis X, a fan 3a and an engine body 3b. The engine body 3b comprises elements (in particular, compressors and turbines) that serve to rotate the fan 3a when the engine 3 is running.

The turbomachine comprises an annular inter-duct element 4 which is concentric with the body of the engine 3 and which, with the latter, bounds an annular duct for a flow of hot air 5 which extends along the engine axis X. The inter-duct element 4 bounds, together with the nacelle 2 and downstream of the fan 3a, a fan duct 6 which extends along the engine axis X and which receives the majority of the flow of air F propelled by the fan 3a as the latter rotates.

The engine 3 is secured to the nacelle 2 by means of two diametrically opposite stays 7a, 7b that serve for the mechanical strength of the turbomachine 1 and, in particular, connect the nacelle 2 and the inter-duct element 4 to one another.

The nacelle 2 comprises, at its upstream end, an annular air intake 10 comprising an outer skin 11 forming an upstream portion of an outer wall 2a of the nacelle 2, an inner skin 12 forming an upstream portion of an inner wall 2b of the nacelle in order to guide the flow of air entering the nacelle 2 towards the fan 3a located downstream, an air intake lip 13 which forms a leading edge of the nacelle 2 and which connects the outer skin 11 and the inner skin 12 to one another, and an annular frame 14 which is located in the thickness of the nacelle 2 (in the thickness means between the outer and inner walls of the nacelle) and which connects the outer skin 11 and the inner skin 12 to one another. The annular frame 14, like the outer skin 11 and the air intake lip 13, are made of metallic materials such as aluminum.

The inner skin 12 is, for example, made of composite materials and forms an acoustic attenuation structure for acoustic attenuation of the noise generated during operation of the engine. The acoustic attenuation structure comprises a first openwork panel 12a which is in contact with the air entering the nacelle 2, a second panel 12b at a distance from the first panel 12a, and a core 12c interposed between the two panels 12a-b. The core 12c consists of a plurality of partitions (not shown) extending between the two panels 12a-b forming a network of acoustic cavities where each acoustic cavity communicates with the air outside the nacelle via the perforations (not shown) created in the first panel 12a so as to form quarter-wave resonators.

The turbomachine 1 comprises an air intake de-icing system 20 which, by bleeding hot air from the engine body 3b, serves to heat the air intake lip 13 and the inner skin 12 (in particular, the first panel 12a) so as to keep them free from any accumulation of ice which might come loose in blocks and damage the fan 3a.

Figure 2:
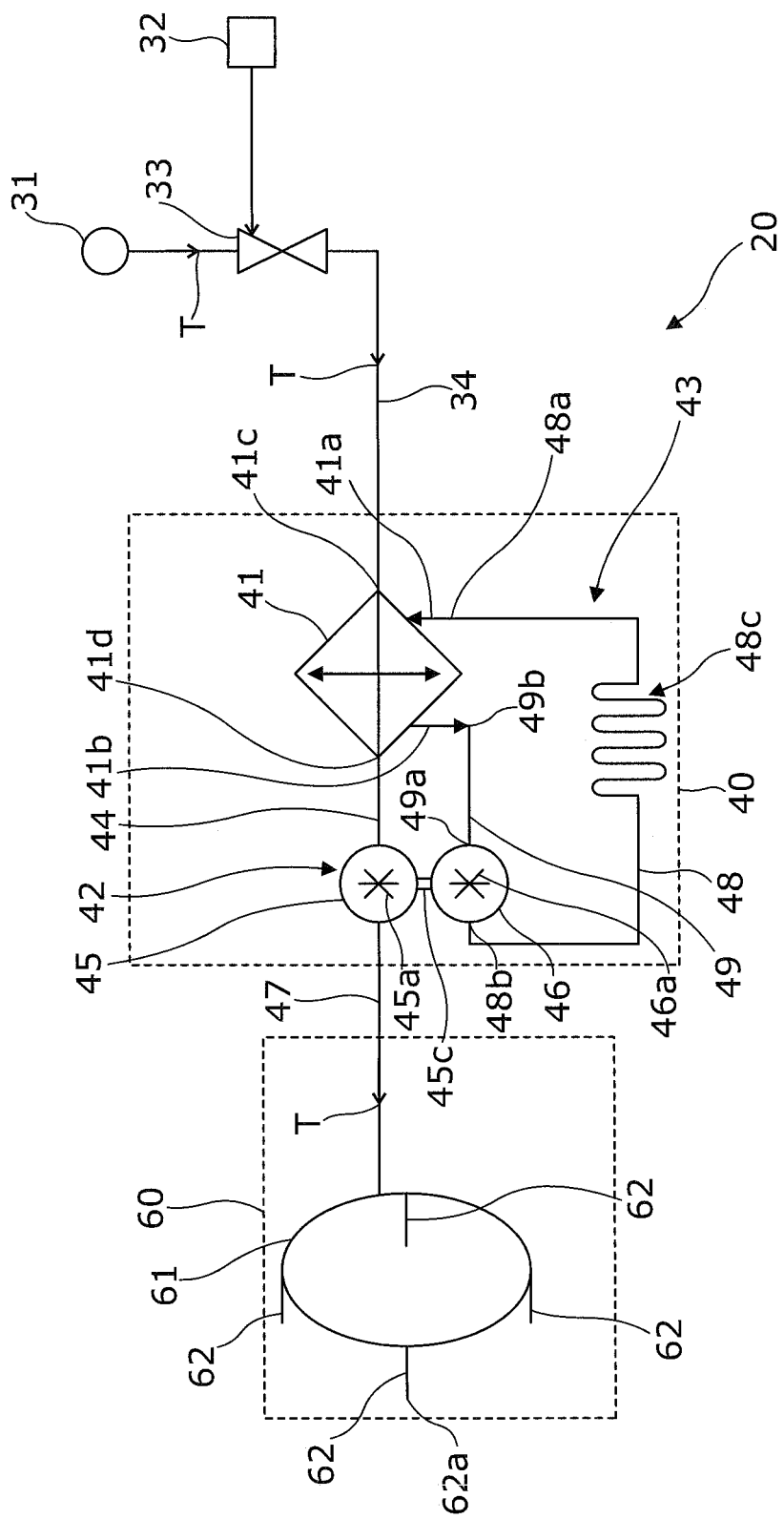
FIG. 2 is a schematic view of the air intake de-icing system shown in FIG. 1, according to one embodiment of the invention.

With reference to FIG. 2, and as is known, the air intake de-icing system 20 comprises an air bleeding port 31 for bleeding a flow of hot air (arrow T in FIGS. 2 and 3 indicating the movement of the bled flow of hot air) from the engine body 3b. The air bleeding port 31 (temperature of the bled flow of hot air T between 200° C. and 300° C., pressure between 10 and 30 bar) is located at a hot stage of the engine body 3b, such as the high-pressure stage of the compressor of the engine (not shown).

According to one embodiment of the invention, the de-icing system 20 further comprises two interconnected heating systems, with an inner skin heating system 40 receiving a flow of hot air from the air bleeding port 31 to heat a liquid circulating in the core 12c of the inner skin 12 of the air intake, and an air intake lip heating system 60 for diffusing the flow of hot air T, once cooled by its passage in the inner skin heating system 40, through the annular frame 14 in order to heat the air intake lip 13.

The air bleed port 31 is connected to the inner skin heating system 40 by a transport line 34 for conveying the bled flow of hot air T to said system.

The inner skin heating system 40 comprises a gas-liquid heat exchanger 41 connected to the air bleeding port 31 to receive the bled flow of hot air T, a passive pumping circuit 42 supplied with the flow of hot air T, a hydraulic circuit 43 for a heat transfer liquid serving for transporting a heat transfer liquid, by means of the pumping system 42, between the heat exchanger 41 and the inner skin 12a of the air intake.

The gas-liquid heat exchanger 41 serves for exchanging heat energy between the flow of hot air and the heat transfer liquid by thermal conduction. The gas-liquid heat exchanger 41 is in the form of a parallelepiped with a hydraulic inlet 41a and a hydraulic outlet 41b. The gas-liquid heat exchanger 41, for example of the "finned tube" type, comprises a plurality of mutually parallel plates (not shown) that are spaced apart from one another and a plurality of tubes (not shown) passing through the plates, perpendicular thereto. The tubes are connected to one another by elbows to form a hydraulic channel (not shown) connected to the hydraulic inlet 41a on one hand and on the other hand to the hydraulic outlet 41b so that the heat transfer liquid can transit through the heat exchanger 41. The heat exchanger 41 comprises an air inlet 41c connected to the transport line 34 in order to receive the flow of hot air T and an air outlet 41d connected to the passive pumping device 42 via a transfer line 44 for removing the hot air from the heat exchanger 41. The plates extend between the air inlet 41c and the air outlet 41d such that the flow of hot air moves while being channeled between the plates, from the air inlet 41c to the air outlet 41d, while heating the tubes.

The passive pumping device 42 is, for example, of the turbine-pump assembly type with a turbine 45 and a rotary pump 46, each provided with a chamber (not shown). The chamber of the turbine 45 is connected, on one hand, to the transfer line 44 to receive a flow of hot air T coming from the heat exchanger 41, and on the other hand, via an outlet line 47, to the air intake lip heating system 60 in order to expel the hot air to the latter.

Each chamber, respectively of the turbine 45 or of the pump 46, comprises a bladed wheel mobile in rotation about an axis perpendicular to the direction of flow of the flow of hot air, or of the heat transfer liquid. The bladed wheels of the turbine 45a and of the pump 46b are mechanically connected to one another by a clutch 45c, for example of the magnetic type, such that the rotation of the bladed wheel of the turbine 45a, under the effect of a circulation of the flow of hot air through the chamber of the turbine 45, drives a rotation of the bladed wheel of the pump 46b and a circulation of the heat transfer fluid through the chamber of the pump 46.

The hydraulic circuit 43 comprises two pipes 48, 49 for transporting heat transfer liquid, with a first pipe 48 arranged in part in the core 12c and having an end 48a connected to the hydraulic inlet 41a of the heat exchanger and another end 48b connected to the chamber of the pump 46. The second pipe 49 has one end 49a connected to the chamber of the pump 46 and another end 49b connected to the hydraulic outlet 41b of the heat exchanger 41

The hydraulic circuit 43 is defined as being the path taken by the heat transfer liquid from the hydraulic outlet 41b of the heat exchanger to the chamber of the pump 46 through the second pipe 49, from the chamber of the pump 46 to the hydraulic inlet of the heat exchanger 41a through the first pipe 48, from the hydraulic inlet 41a of the heat exchanger to its hydraulic outlet 41b through the hydraulic channel.

The portion 48c of the first pipe 48 arranged in the core 12c extends over all or part of the circumference of the air intake 10 and preferably extends in the core 12c in a serpentine pattern to maximize the surfaces that are in contact.

The air intake lip heating system 60 receives the hot air from the inner skin heating system 40 via the outlet line 47. The air intake lip heating system 60 comprises a circular line 61, connected to the outlet line 47, which runs along the perimeter of the annular frame 14 of the air intake 10. The circular line 61 comprises at least one extension 62, and preferably a plurality thereof equally spaced along its circumference, where each extension 62 passes through the annular frame 14 to enter and extend within the space bounded by the air intake lip 13, the inner and outer skins 11, 12 and the frame 14. The end 62a of each extension 62 is an air diffusion nozzle located close to the air intake lip 13 so as to blow a portion of the flow of hot air onto the latter.

During operation of the de-icing circuit 20, when a flow of hot air T arrives, via the transport line 34, to the inner skin heating system 40, this flow of hot air causes the bladed wheel of the turbine 45a to rotate, which drives the rotation of the bladed wheel of the pump 46a so as to generate a circulation of the heat transfer liquid. The heat transfer liquid is heated in the gas-liquid heat exchanger 41 and is cooled at the inner skin 12 of the air intake. The movement of the heat transfer liquid serves to bring heat energy to the inner skin 12 of the air intake in order to heat up the latter and prevent any buildup of ice on said skin. Considering a flow of hot air at a temperature of between 200° C. and 300° C., bled from the engine body 3b, the temperature of the heat transfer liquid circulating in the first pipe 48 is between 50° C. and 100° C., which is below the maximum permitted temperature to which composite materials can be subjected.

On leaving the heat exchanger 41, the flow of hot air T is cooled since some of its heat energy has been passed to the heat transfer liquid. Considering the preceding example, the temperature of the flow of hot air T leaving the inner skin heating system 40 is reduced by approximately 50° C., to a temperature of the order of 150° C. to 250° C. The temperature of the air diffused via the circular line 61 in the space bounded by the lip 13, the frame 14, the inner skin 12, the outer skin 11, is below the critical temperature to which aluminum can be subjected.

The de-icing system 20 according to the invention is compatible with an air intake 10 having portions made in part of composite materials and of aluminum, and is compatible with other materials such as titanium. Its operation, by bleeding a flow of hot air T from the engine body 3b and by circulating a heat transfer liquid by means of a passive pumping device 42, is simple and cost-effective in terms of added mass.

In one variant embodiment of the invention, and with reference to FIG. 3, the de-icing system 20 is identical and the constituent elements bear the same characterizing references, only the passive pumping device 42 is located upstream, with reference to the direction of movement of the bled flow of hot air T, of the heat exchanger 41. This configuration does not change the advantages and the overall operation of the invention as described above.

Preferably, and as shown in FIGS. 2 and 3, the de-icing system 20 comprises a central unit 32 and a control valve 33 arranged on the transport line 34. The control valve 33 can be switched between an open position in which it allows a flow of hot air to circulate towards the inner skin heating system 40 and a closed position in which it blocks the flow of hot air. In the closed position of the control valve 33, the bleeding of hot air from the engine body 3b is stopped.

The control valve 33 is driven electrically by the central unit 32 so as to move said valve between its open and closed positions. The central unit 32 receives de-icing instructions from the cockpit (manual action) or by means of avionics systems of the airplane (automatic de-icing).

It is noted that, in the example shown in FIG. 1, the control valve 33 is arranged in the inter-duct element, and the line extends partially within the inter-duct element to meet, via the stay 7a, the inner skin heating system 40 located in the core 12c of the air intake, between the inner skin 12 and the outer skin 11, and downstream of the annular frame 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A two-flow turbomachine comprising:
an engine body,
an annular nacelle surrounding the engine body;
the annular nacelle having an air intake comprising an outer skin, an inner skin, an air intake lip forming a leading edge of the annular nacelle and connecting the outer and inner skins to one another, and an annular frame connecting the outer and inner skins to one another;
the inner skin comprising a first panel in contact with the air entering the annular nacelle, a second panel at a distance from the first panel, and a core interposed between the two panels; and
a system for de-icing the air intake having an air bleeding port for bleeding a flow of hot air from the engine body, wherein the system for de-icing comprises:
an inner skin heating system connected to the air bleeding port to receive the flow of hot air, the inner skin heating system comprising a gas-liquid heat exchanger through which the flow of hot air passes, a hydraulic circuit containing a heat transfer liquid and arranged in part in the heat exchanger and in the core, and a device for passive pumping of the heat transfer liquid configured to operate with a circulation of the flow of hot air; and
a heating system having a circulation line connected to the inner skin heating system to receive the flow of hot air after the flow of hot air has passed through said inner skin heating system, the circulation line comprising at least one extension passing through the annular frame and extending into a space bounded by the air intake lip, the inner skin, the outer skin and the annular frame.

2. The turbomachine according to claim 1, wherein the passive pumping device is a turbine-pump assembly with a turbine and a pump, both the turbine and the pump being provided with a chamber in which there is arranged a bladed wheel, the chamber of the turbine receiving the flow of hot air and the chamber of the pump receiving the heat transfer liquid, the bladed wheel of the turbine being mechanically linked to the bladed wheel of the pump such that rotation of the bladed wheel of the turbine, under action of the circulation of the flow of hot air through the chamber of the turbine, drives a rotation of the bladed wheel of the pump and a circulation of the heat transfer liquid through the chamber of the pump.

3. The turbomachine according to claim 2, the heat exchanger having a hydraulic inlet and a hydraulic outlet, wherein the hydraulic circuit comprises two pipes for transporting the heat transfer liquid, with a first of the two pipes having a portion arranged in the core and having a first end connected to the hydraulic inlet of the heat exchanger and a second end connected to the chamber of the pump, a second of the two pipes having a first end connected to the chamber of the pump and a second end connected to the hydraulic outlet of the heat exchanger.

4. The turbomachine according to claim 3, wherein the portion of the first pipe arranged in the core extends over all or part of a circumference of the air intake.

5. The turbomachine according to claim 3, wherein the portion of the first pipe arranged in the core extends in a serpentine pattern in the core.

6. The turbomachine according to claim 1, wherein the system for de-icing comprises a central unit and a control valve, said valve being configured to be moved between an open position in which the flow of hot air bled from the body of the engine circulates towards the inner skin heating system, and a closed position in which no flow of hot air passes beyond the control valve, and the control valve is driven electrically by the central unit so as to move said valve between its open or closed positions.

7. The turbomachine according to claim 1, wherein the circulation line runs along a perimeter of the annular frame and the at least one extension includes a plurality of extensions equally spaced along a circumference of the circulation line, and where each of the plurality of extensions passes through the annular frame.

* * * * *